Nov. 14, 1939.   R. B CAMPBELL   2,179,613
PARKING METER
Filed March 1, 1937   3 Sheets-Sheet 1

Inventor
Rodney B. Campbell
By
Attorney

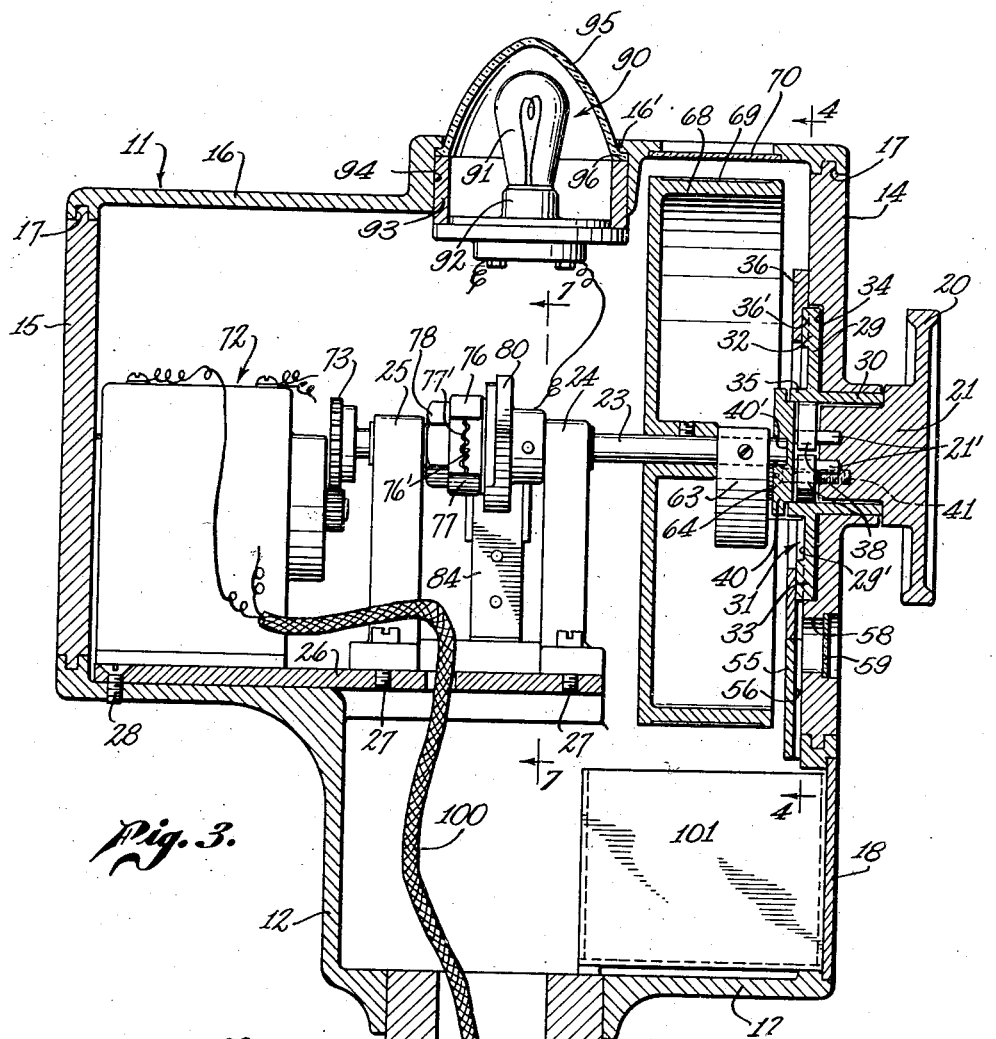

Nov. 14, 1939.  R. B. CAMPBELL  2,179,613
PARKING METER
Filed March 1, 1937  3 Sheets-Sheet 3

Inventor
Rodney B. Campbell

By
Attorney

Patented Nov. 14, 1939

2,179,613

UNITED STATES PATENT OFFICE 2,179,613

PARKING METER

Rodney B. Campbell, Los Angeles, Calif.

Application March 1, 1937, Serial No. 128,473

7 Claims. (Cl. 194—9)

This invention relates to devices used for the regulation of vehicle parking and which have been termed parking meters. These meters are designed to indicate whether a vehicle is legally parked, that is, whether the vehicle has been parked in one place longer than the period of time prescribed by law, and to provide a means for collecting a parking fee.

This is generally accomplished by a device which is started by the motorist when he enters the parking space upon insertion of a coin in a meter and manual actuation of a member to start the operating mechanism of the machine running. The device is set to run for a period of time equal to the legal parking limit.

The present parking meters utilize various types of clock mechanisms which require frequent periodic winding. The meters do not have means for giving a sensible indication that the meter is in operation which is visible at a distance. This is a disadvantage, in that it is necessary with the present form of meters for a policeman to closely examine each meter in order to determine whether a vehicle is legally parked. In addition to these disadvantages, the present devices are not fool-proof and may become inoperative if roughly manipulated.

In view of the disadvantages of the present type of parking meter, it is a primary object of this invention to provide a parking meter of simple form and construction which is electrically driven and which will give a sensible indicaton when it is operating which can be readily seen at a distance.

It is a further object of this invention to provide a parking meter which is fool-proof and can not be rendered inoperative by manipulation of the actuating member, and which cannot be operated except by the use of a particular coin or an object approximating the size and shape of a coin. In this connection, it is an object to provide means for detecting when the parking meter has been operated with a slug.

It is also an object of this invention to provide a device of the character described, which, when set at the starting position will indicate that it is so set, but which, after it has run for a period of time is adaptable to be constructed either to indicate or not to indicate how much time has elapsed or how much time remains for it to run before the set time limit has elapsed.

It is also an object of this invention to provide means for adjusting the device to run for any desirable predetermined period of time.

These objects are attained in the structure shown in the accompanying drawings, in which:

Fig. 3 is a sectional elevation of the device shown in Fig. 1 showing a preferred form of the invention.

Fig. 7 is a section on line 7—7 of Fig. 3 showing the motor switch actuating mechanism and the light switch actuating mechanism in the "on" or starting position.

Figure 1:
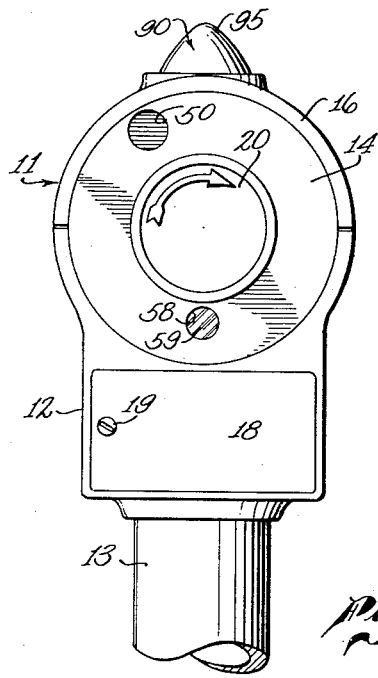
Fig. 1 is a front elevation of a parking meter embodying a preferred form of the invention.
Figure 2:
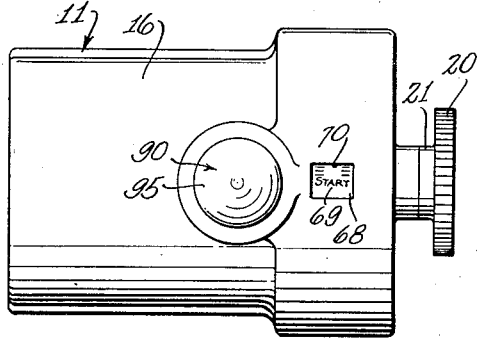
Fig. 2 is a top plan view of the device shown in Fig. 1.

Referring to the drawings, reference numeral 11 generally indicates a housing which comprises a lower portion 12 adapted to be attached to a standard 13 of any suitable type. The standard is ordinarily mounted adjacent the curbstone where the car is to be parked and is of suitable height to bring the meter in an easily accessible position. The upper portion of the housing 11 comprises a front face plate 14 circular in shape and a rear face plate 15, also circular in shape, which are removably mounted on the lower portion 12. The housing also includes a top cover member 16 adapted to fit over the face plates and the lower portion of the housing. The joints between these members 12, 14, 15 and 16 are of the tongue and groove type, as indicated at 17, Fig. 3, in order to provide a weather-proof housing.

The lower portion 12 of the housing has mounted on the front side a plate 18 which is removably mounted therein and is adapted to be held in place by lock 19 which may be of any suitable type of lock utilizing a key for actuation. The cover 16 may be bolted or otherwise secured on the inside to the lower portion 12 of the housing in any suitable manner, thus holding the parts of the housing together. Access may be had to such securing means by removal of plate 18.

In the center of the front face plate 14 is rotatably mounted an operating knob 20 which has an inwardly extending hub 21. A shaft 23 extends longitudinally of the parking meter and is supported by posts 24 and 25 which are mounted on a floor 26 by means of screws 27. The floor is secured to the lower portion 12 of the housing by means of suitable screws 28.

Rotatably mounted on the hub 21 of the operating knob 20 is a coin disk 29 having an outwardly extending hub 30, the disk 29 being provided with semi-circular inwardly extending lugs 32 and 33. This disk fits into an annular recess 34 in the back of the face plate 14 with its inner face in the same plane as the inner face of the face plate, the lugs 32 and 33 extending inwardly beyond the plane of the rear face of the face plate. The coin disk 29 has an inwardly extending hub 35 which forms the inner wall of a circular coin race 31. Mounted on the rear of the face plate 14 is a coin retaining ring 36 which has an annular recess 36' to accommodate the lugs 32 and 33 of the coin disk 29. This retaining ring constitutes the outer boundary of the coin race 31.

Figure 4:
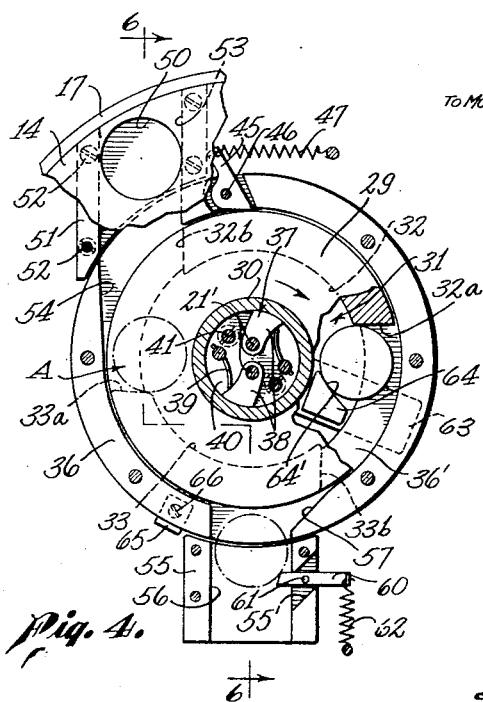
Fig. 4 is a vertical sectional elevation on line 4—4 of Fig. 3, a portion of the device being broken away.
Figure 5:
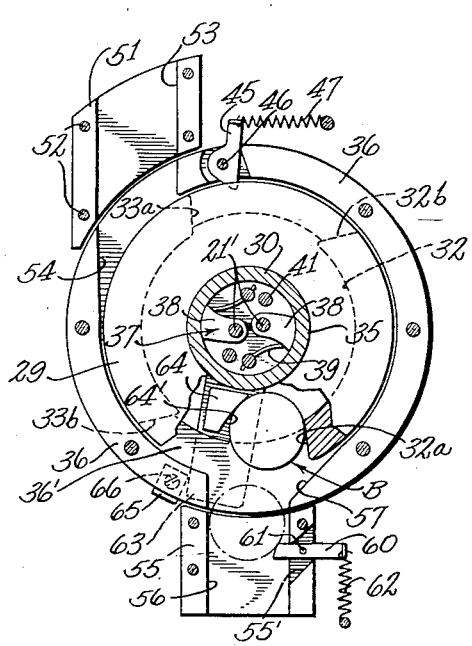
Fig. 5 is a view similar to Fig. 4 showing the mechanism in the starting position.

By reference to Figs. 3, 4 and 5 it can be seen that the coin retaining ring 36 and the hub 35 cooperate to retain a coin in the circular coin race 31. The lugs 32 and 33 terminate in shoulders 32a, 32b, 33a and 33b, shoulders 32a and 33a being designed to propel a coin around a portion of the circular coin race as indicated in Figs. 4 and 5 from point A (Fig. 4) where the coin enters the race, to point B (Fig. 5) where it leaves the race. The operation of this mechanism is subsequently more fully described.

For the purpose of actuating the coin disk 29 clutch means generally indicated by reference numeral 37 is provided. This clutch means includes a pair of spindles 21' mounted in the end of the hub 21 of the operating knob 20, on each of which is mounted a clutch member 38. The clutch members are pressed against the inner surface of the coin disk hub 35 by flat spring members 39. A cover plate 40, held in place by means of screws 41, is positioned on the inner end of the hub 21 and serves to keep the clutch members 38 on the spindles 21'. It has a recess 40' to accommodate the outer end of the shaft 23.

By rotating the operating knob 20 in a clockwise direction the coin disk 29 may be rotated in the same direction by reason of the clutch members 38 engaging the inner surface of the coin disk hub 35. If the operating knob is rotated in a counterclockwise direction it will not rotate the coin disk as the clutch is designed to slip in that direction.

To guard against the possibility of the clutch sticking and thus becoming effective to drive the coin disk in a counterclockwise direction, a dog 45 is pivotally mounted at 46 on the rear of face plate 14. A tension spring 47 serves to force the dog into the path of the lugs 32 and 33 and thus prevent counterclockwise rotation of the coin disk.

Figure 6:
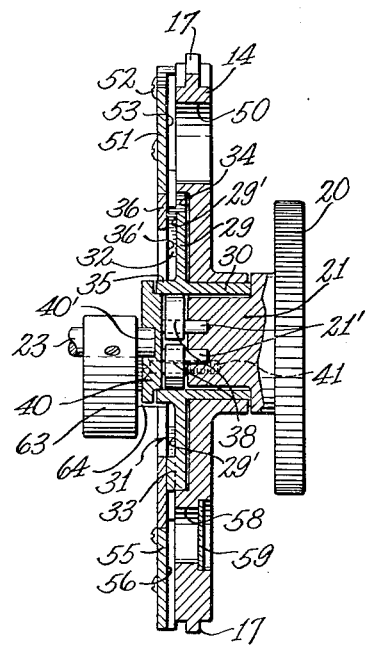
Fig. 6 is a fragmentary section through the coin slot taken on line 6—6 of Fig. 4.

The front face plate 14 has an opening 50 for the reception of a coin. In back of this opening on the rear of the plate 14 is mounted a member 51 by means of screws 52, which member is recessed to provide a coin receiving slot 53. The coin retaining ring 36 is cut away at 54 to form a continuation of this coin slot 53. Thus a coin may be inserted in the opening 50, (see Figs. 4 and 6) from which it descends in the coin slot 53 and the continuation thereof at 54 into the position indicated by reference letter "A" in Fig. 4.

A coin discharge member 55 is mounted on the rear of the face plate 14 near the bottom and is recessed to provide a coin discharge slot 56. The coin retaining ring 36 is cut away at 57 to permit entrance of a coin into the slot. In the lower portion of the face plate 14 a window 58 having glass 59 therein, is provided directly in front of the coin slot 56 and provides means for viewing a coin in the slot 56.

In this connection a dog 60 is provided pivotally mounted at 61 on the rear of the face plate 14 for the purpose of releasably holding a coin in position behind the viewing window 58 so that it may be observed. The dog extends through a slot 55' in the coin discharge member 55 and is releasably held in the path of a coin by means of spring 62. It is apparent that with this construction a coin discharged from the coin race will be held in position behind the window until another coin forces it past the dog 60.

Keyed to the shaft 23 is an arm 63 having a finger 64 which extends into the coin race where it is engaged by a coin and moved thereby to the position shown in Fig. 5. The finger 64 also serves as means for ejecting a coin from the race, as will subsequently appear in connection with the description of the operation of the parking meter. Means for limiting movement of this arm comprises a stop member 65 mounted on coin retaining ring 36 by screw 66. The purpose of this arm will be subequently described.

Also mounted on shaft 23 is a drum 68 which has suitable indicia mounted on its periphery at 69 and visible through a glass window 70 in the top cover plate 16. This drum 68 is rotated by means of a suitable electric motor and reduction gears diagrammatically indicated at 72 which drive the shaft through the gear means 73 on the inner end of the shaft. It has been found suitable to provide reduction gears between the motor and the shaft which will cause the drum 68 to make one complete revolution in two hours, however any suitable period of time for one complete revolution of the drum may be effected by use of suitable reduction gears.

The drum has been shown and described as having the indicia on its periphery, but it is within the scope of the invention to place an inwardly extending flange at the outer side of the drum and place the indicia on this flange. In which case the face plate 14 would be provided with a window for observing the indicia on the drum. In either case it is desirable to have a small observation window, such as is shown, and indicia which will show whether or not the machine is in the starting position, and will not indicate how long it has yet to run or how long it has been in operation. If desirable, however, a larger window and suitable indicia may be provided to indicate elapsed time.

Figure 9:
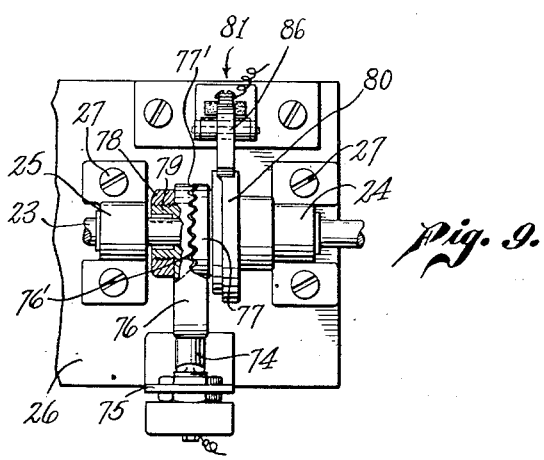
Fig. 9 is a top plan view of the motor switch and light switch actuating mechanism showing the adjustable feature of the motor switch actuating mechanism.

For the purpose of starting the motor a snap switch 74, which is electrically connected in the motor circuit, is provided mounted on a supporting member 75. This switch is adapted to be actuated by rotation of the shaft 23 and this is accomplished by means of the fingers 76 and 77 which are mounted on the shaft 23. Finger 77 is keyed to the shaft and is provided with a hub 79 upon which the finger 76 is mounted. These fingers have innner serrated edges 76' and 77' respectively for the purpose of adjustment and are held in locked engagement as shown in Fig. 9 by means of a nut 78 which is threaded on the hub 79 of the finger 77.

Outwardly disposed with relation to the fingers 76 and 77 is a cam 80 for the purpose of actuating a light switch generally indicated by reference numeral 81. This light switch comprises the switch contacts 82 and 83 which are mounted on the standard 84, being suitably insulated from each other and the standard by means of insulation 85. At the upper end of the standard is pivotally mounted an actuating member 86 which is pressed into engagement with the face of cam 80 by the spring contact 83. When the cam is in the position shown in Fig. 7 it forces contact 83 against contact 82 thereby completing an electric circuit through the light means which is generally indicated at 90 in Fig. 3. Although a particular type of switch is shown, it is contemplated that standard mercury switches may be used in place of the switches shown.

This light means 90 comprises an incandescent lamp 91 of suitable size mounted in a base 92 which is held against ring 93 by screws (not shown) threaded into the cover 16 and having washers adapted to extend over the edges of the base 92. The ring 93 extends into the circular opening 94 in the top cover 16. A glass cover 95 of any suitable color is provided and has a flanged base 96 which is adapted to be mounted between the ring 93 and a flange 16' extending into the opening 94 to hold the glass cover in position.

A cable 100 is provided which extends downwardly through the housing and through the standard 13 to a source of electric potential. It is to be understood that the motor 72, light 90, and the motor switch 74 and light switch 81 are suitably connected so that the closing of motor switch 74 will establish an electric circuit through the motor and the closing of switch 81 will establish a circuit through the light 90.

In the lower portion 12 of the housing 11 is situated a removable coin box 101 adapted to receive coins placed in the machine after they leave the coin slot 56.

Referring particularly to Figs. 3, 4, 5 and 6, the device operates as follows:

A coin is inserted in the opening 50 in face plate 14. The coin drops down the coin slot 53 into the position A in Fig. 4 where it rests upon the shoulder 33a of the lug 33. The operating knob 20 is then turned clockwise causing the coin disk 29 to rotate in the same direction by reason of the clutch means 37 interposed between the knob and the disk. The coin at A is engaged by shoulder 33a of lug 33 and is rolled around the coin race 31 to the position where it engages the finger 64 of the arm 63. As above indicated, the coin rolls around on the hub 35 of the coin disk 29 and is retained in position against this hub by the coin retaining ring 36, one side of the coin lying against the inner face 29' of the coin disk 29. Further rotation of the operation knob 20 causes the coin to move arm 63 from the position in which it is shown in Fig. 4, (or from any other position it happens to be in at the time) to the position it occupies in Fig. 5, further movement of the arm being prevented by the stop 65. A slight further rotation of the operating knob 20 causes the coin to be ejected from the race into the coin slot 56 through the cutaway portion 57 of the coin retaining ring 36. In this connection the engaged face 64' of finger 64 is cut at an angle as shown to facilitate the ejection of the coin. After being ejected from the coin race the coin is releasably held in slot 56 behind the window 59 until it is subsequently forced past dog 60 down into coin box 101 by the next coin put into the parking meter.

Movement of the arm 63 rotates shaft 32 in a clockwise direction, thereby rotating drum 68 to the starting postion which is indicated through window 70 by the indicia 69. The device may be set at the starting position at any time and it is not necessary that it operate for the set period of time before it can be reset. In this connection, it should be pointed out that the coin disk is adapted to be returned to a coin receiving position (Fig. 4) by manual clockwise rotation of the operating knob 20. If the disk is in what may be termed a non-coin-receiving position (Fig. 5) when a coin is dropped in the device, the coin will ride on the periphery of one of the lug portions of the disk until the disk is rotated sufficiently to receive the coin between two ends of the lugs as in Fig. 4. Subsequent rotation of the disk sets the mechanism as described above.

Figure 8:
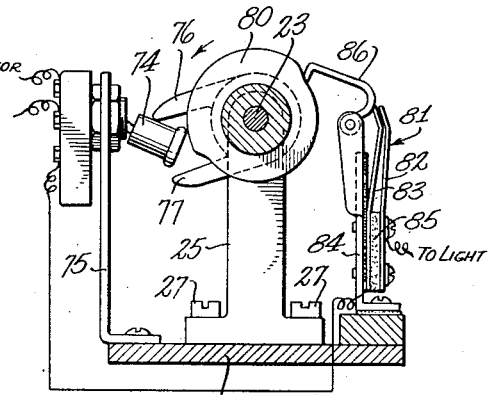
Fig. 8 is a view similar to Fig. 7 but showing the motor switch actuating mechanism and the light switch actuating mechanism in the "off" position after the device has operated the predetermined period of time.

Referring now to Figs. 7 and 8, it can be seen that rotation of shaft 23 causes the finger 77 to close the motor starting switch 74. This completes an electric circuit through the motor and causes the device to begin timing the parking period. The rotation of the shaft 23 causes the rotation of the cam 80 to the position shown in Fig. 7, thereby moving the pivoted finger 86 to cause contacts 82 and 83 to engage and complete an electric circuit through the lamp means 90. When the motor has been started it causes drum 68 to rotate and the lamp to be illuminated, indicating that the parking meter is in operation and that the motorist is legally parked in the space allotted to the meter.

After the device has been in operation for the predetermined period of time and the fingers have moved to the position shown in Fig. 8, finger 76 opens the motor switch 74, thus breaking the circuit and causing the motor to stop. The cam 80 has also moved into the position shown in Fig. 8 and the finger 86 is now engaging the periphery portion of the cam 80 at a point where the radius is less than at the point formerly engaged. This position of the finger 86 permits the contacts 82 and 83 to separate, thus breaking the circuit through the lamp. It is not essential that the lamp and motor switches be synchronously operated, however, and the lamp may be set to operate either before or after the motor switch is opened. When it is desired to start the parking meter in operation again it is necessary to insert a coin in the aperture 50 and turn the knob 20 in a clockwise direction, as above described.

In order to provide for adjusting the machine to operate for different lengths of time the finger 76 is adjustably mounted with relation to finger 77 as above described. This permits them to be set at any distance apart so that they will operate the motor switch after any predetermined period of time has elapsed.

From this description it should be apparent that the device attains all the objects claimed for it. The particular construction prevents the operation of the machine by any means not approximating a designated coin in size and shape. It also provides for re-starting at any time.

It should also be apparent from this description that since the parking meter embodies an electric lamp which is visible at a distance and which burns during the operation of the meter, that is during the legal period of parking, a policeman may quickly ascertain which vehicles in a block are illegally parked merely by looking down the block and noting which vehicles are adjacent parking meters, the lights of which are not burning. Thus a policeman may patrol several streets in a short time without the necessity of closely examining each meter to determine whether or not a car is legally parked.

I claim as my invention:

1. In a coin controlled parking meter the combination of a housing, a shaft mounted in said housing, an indicator mounted on said shaft, a motor for rotating said shaft at a predetermined speed, an arm radially mounted on said shaft, an operating knob, means operable by turning said knob for propelling and guiding a coin about a semi-circular path when said operating knob is turned, said arm extending into the path of the coin and being adapted to be engaged by a coin being propelled in said semi-circular path to set said shaft and indicator means at a predetermined position, and means operable by the rotation of said shaft in one direction for closing a circuit through said motor and for breaking the circuit through said motor when said shaft is rotated a predetermined distance in the opposite direction.

2. In a coin controlled parking meter the combination of a housing, a shaft mounted in said housing, a drum mounted on said shaft and having indicia thereon, an electric motor for rotating said shaft at a predetermined speed, an arm radially mounted on said shaft, an operating knob, means for propelling and guiding a coin about a semi-circular path when said operating knob is turned, said arm being adapted to be engaged by a coin being propelled in said semi-circular path to set said shaft and drum at a predetermined position, means operable by the rotation of said shaft in one direction for closing an electrical circuit through said electric motor and for breaking the circuit through said motor when said shaft is rotated a predetermined distance in the opposite direction, a lamp, and means operable by the rotation of said shaft in one direction for closing an electric circuit through said lamp and for breaking the circuit through said lamp when said shaft is rotated a predetermined distance in the opposite direction.

3. In a coin controlled parking meter the combination of a housing, a shaft mounted in said housing, an electric motor for rotating said shaft at a predetermined speed, an arm radially mounted on said shaft and having an outwardly projecting finger, an operating knob, means for propelling and guiding a coin about a semi-circular path when said operating knob is turned, the finger on said arm being adapted to be engaged by a coin being propelled in said semi-circular path to set said shaft at a predetermined position, switch means adapted to make and break a circuit through said electric motor, a pair of spaced fingers on said shaft adapted to engage said switch means, one of said fingers being adapted to close the switch when said shaft is turned in one direction and the other of said fingers being adapted to open said switch when said shaft is rotated a predetermined distance in the opposite direction.

4. In a coin controlled parking meter the combination of a housing, a shaft mounted in said housing, means for driving said shaft, a circular face plate forming a portion of the front of said housing having a central opening and having an opening to receive a coin, an operating knob rotatably mounted in said central opening having an inwardly extending hub, a coin disk rotatably mounted on the hub of said operating knob having lugs on its inner face adapted to engage a coin and having an inwardly extending hub portion, clutch means associated with said operating knob and adapted to engage said coin disk, a coin retaining ring mounted on the inner face of said face plate having an annular recess adapted to accommodate the lugs of said coin disk, said coin disk and said retaining ring cooperating to form a circular coin race, means for guiding a coin from said coin opening in said face plate into said circular coin race, an arm mounted on said shaft, a finger on said arm extending into said coin race and adapted to be engaged by a coin in said coin race, and means for conducting said coin from said coin race to a coin box in said housing.

5. In a coin controlled parking meter, the combination of a housing, a shaft mounted in said housing, a motor for driving said shaft, a circular face plate forming a portion of the front of said housing and having a coin opening, an operating knob rotatably mounted in said face plate having an inwardly extending hub portion, a coin disk rotatably mounted on the hub of said knob having lugs on its inner face adapted to engage a coin and having an inwardly extending hub, clutch means associated with said operating knob and adapted to engage said coin disk, means forming a circular coin race, an arm mounted on said shaft, a finger on said arm adapted to extend into said coin race and adapted to be engaged by a coin in said coin race, the lugs of said coin disk being adapted to propel a coin around said coin race to move said arm and said shaft to a predetermined position.

6. In a coin controlled parking meter the combination of a housing, a shaft mounted in said housing, an electric motor for driving said shaft, a motor switch electrically connected in a circuit including said motor, two finger members adjustably mounted on said shaft and adapted to actuate said motor switch, a lamp, a lamp switch in said housing, a cam on said shaft, a lever operable by said cam for operating said lamp switch, a drum mounted on said shaft and having indicia thereon, a circular face plate forming a portion of the front of said housing having an opening adapted to receive a coin, an operating knob rotatably mounted in said face plate having an inwardly extending hub portion, a coin disk rotatably mounted on the hub portion of said knob having lugs on its inner face adapted to engage a coin and having an inwardly extending hub, clutch means associated with said operating knob and adapted to engage said coin disk, a coin retaining ring mounted on the inner face of said face plate having an annular recess adapted to accommodate the lugs of said coin disk, said coin disk and said coin retaining ring cooperating to form a circular coin race, means for guiding a coin from said coin opening in said face plate into said circular coin race, an arm mounted on said shaft, a finger on said arm extending into said coin race and adapted to be engaged by a coin in said coin race, and means for conducting a coin from said coin race to a coin box in said housing.

7. In a coin controlled parking meter the combination of a housing, a shaft mounted in said housing, an electric motor for driving said shaft, a motor switch, two finger members adjustably mounted on said shaft and adapted to actuate said motor switch, a lamp, a lamp switch in said housing, a cam on said shaft, a lever operated by said cam for operating said lamp switch, a drum mounted on said shaft and having indicia thereon, a circular face plate forming a portion of the front of said housing having an opening adapted to receive a coin, an operating knob rotatably mounted in said face plate and having an inwardly extending hub portion, a coin disk rotatably mounted on the hub portion of said knob having lugs on its inner face adapted to engage a coin and having an inwardly extending hub, dog means for preventing the rotation of said coin disk in a counterclockwise direction, clutch means positioned between said coin disk and said operating knob, a coin retaining ring mounted on the inner face of said face plate having an annular recess adapted to accommodate the lugs of said coin disk, said coin disk and said coin retaining ring cooperating to form a circular coin race, means providing a coin slot leading from said coin opening in said face plate to one portion of said circular coin race, an arm mounted on said shaft, a finger on said arm extending into said coin race and adapted to be engaged by a coin in said race, means forming a discharge coin slot for conducting a coin from said coin race to a coin box in said housing, means for viewing a coin in said discharge coin slot, and means for releasably holding a coin in place in said discharge slot behind said viewing means.

RODNEY B. CAMPBELL.